United States Patent [19]

Carruthers

[11] Patent Number: 4,928,866

[45] Date of Patent: May 29, 1990

[54] PIPE BURSTER

[75] Inventor: Alec R. Carruthers, Bratton, England

[73] Assignee: British Gas plc, London, England

[21] Appl. No.: 299,544

[22] Filed: Jan. 11, 1989

[30] Foreign Application Priority Data

Jan. 12, 1988 [GB] United Kingdom ................. 8800597

[51] Int. Cl.⁵ .............................................. F16L 55/18
[52] U.S. Cl. ...................................... 225/106; 138/97
[58] Field of Search .................... 225/93, 103; 138/97, 138/178; 166/55.2; 405/156

[56] References Cited

U.S. PATENT DOCUMENTS

| 4,487,052 | 12/1984 | Yarnell | 72/393 |
| 4,505,302 | 3/1985 | Streatfield et al. | 138/97 |
| 4,693,404 | 9/1987 | Wayman et al. | 225/103 |

FOREIGN PATENT DOCUMENTS

| 0146331 | 6/1985 | European Pat. Off. |
| 0190502 | 8/1986 | European Pat. Off. |
| 0190933 | 8/1986 | European Pat. Off. |
| 0269653 | 12/1987 | European Pat. Off. |
| 03353 | 6/1987 | PCT Int'l Appl. |
| 2167156 | 5/1986 | United Kingdom |
| 2171485 | 8/1986 | United Kingdom |

Primary Examiner—Hien H. Phan
Attorney, Agent, or Firm—Larson and Taylor

[57] ABSTRACT

The burster has a body in two parts 10, 12 separable by pistons 20, 22, 24 in cylinders 14, 16, 18 in the part 12. The pistons have piston rods 32, 34, 36 secured to the part 10 by screws 54. The relative rectilinear movement of the parts 10, 12 is guided by the sliding engagement between the internal cylindrical surfaces 58, 60, 62 of the rings 44 and 46 and of the cylinder 18 and the external surfaces of the piston rods 32, 34, 36. Separating movement is effected by fluid fed into the three cylinders via a passage 88 and is limited by engagement between stop surfaces 66, 68 on the part 10 and stop surfaces on the part 12. Approach movement is effected by fluid fed into two cylinders 14, 16 via a passage 90 and is limited by engagement between the inner surface 64 of the part 10 and the rings 44, 46.

6 Claims, 7 Drawing Sheets

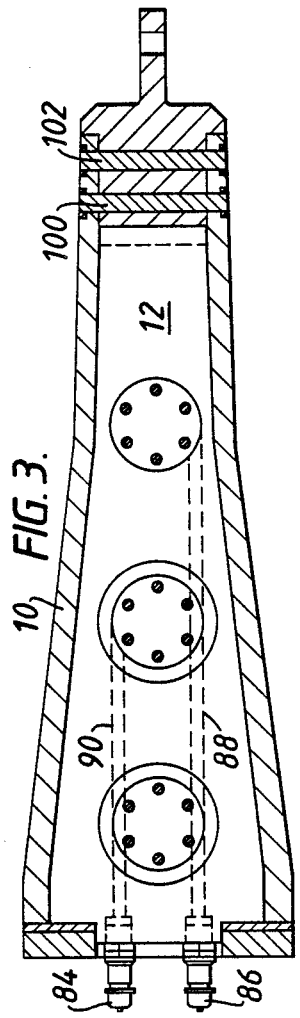
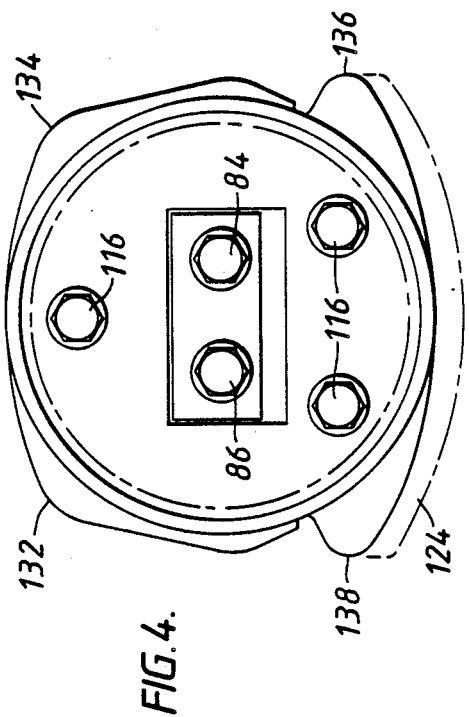

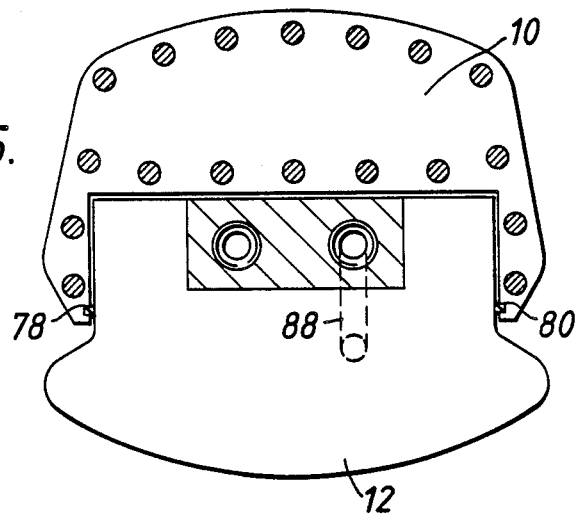
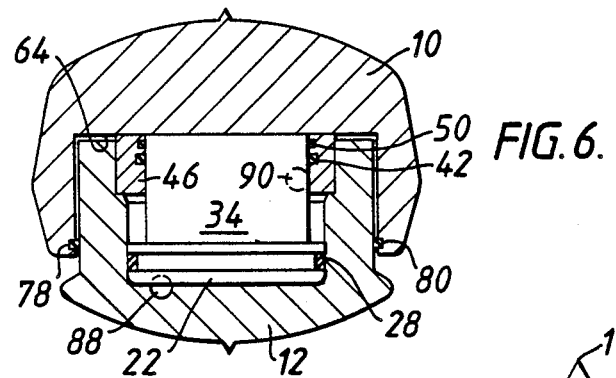
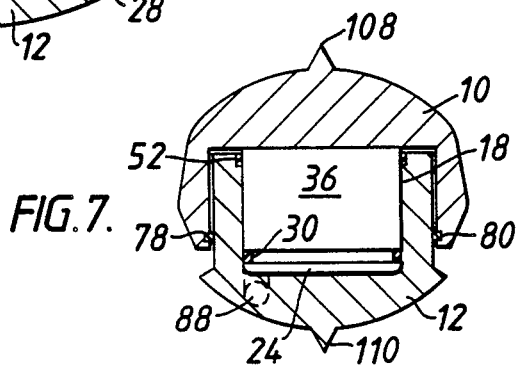

PIPE BURSTER

The invention relates to pipe bursters to bursting gas mains, sewers, water mains or other pipes.

It is known to replace existing pipes, such as distribution mains for natural gas made of cast iron or other metal, for example, by bursting the pipe using a pipe burster and inserting a new pipe in the passage in the ground formed by the burster. That technique is described for example in British patent specifications Serial Nos. 2092701A and 2169681A which also describe proposed examples of pipe bursters.

The burster described in specification Ser. No. 2169681A comprises a body in two parts which are relatively movable by a wedge which is moved between the parts in the longitudinal direction of the burster by a longitudinally extending hydraulic ram. In such a burster, the friction arising at the sliding surfaces of the wedge reduced the force available for bursting the main or other pipe. Also, the overall length of the burster was increased by the length of the hydraulic cylinder beyond the length of the two separable parts.

The object of the present invention is to provide a burster in which those disadvantages are avoided.

A pipe burster according to the invention comprises an elongated body in two parts extending in the lengthwise direction of the body, the two parts beng mutually guided by guide surfaces so as to be capable of relative rectilinear separating and approach movements transversely to said direction, hydraulic piston-and-cylinder means spaced apart along the body being operable in unison to effect at least said separating movement.

Preferably, said piston-and-cylinder means comprise cylinders which are in one of said parts and which contain respective pistons having respective piston rods secured to the other of said parts, said guide surfaces comprising concave cylindrical surfaces on said one part and respective convex cylindrical surfaces on said piston rods.

An embodiment of the invention will now be described by way of example with reference to the accompanying drawings in which:

FIG. 3 is a horizontal section on the line III—III in FIG. 2;

FIG. 4 is an end elevation as seen in the direction of the arrow IV in FIG. 2;

FIGS. 5, 6, 7 and 8 are vertical sections on the lines V—V, VI—VI; VII—VII; and VIII—VIII, respectively;

Figure 1:
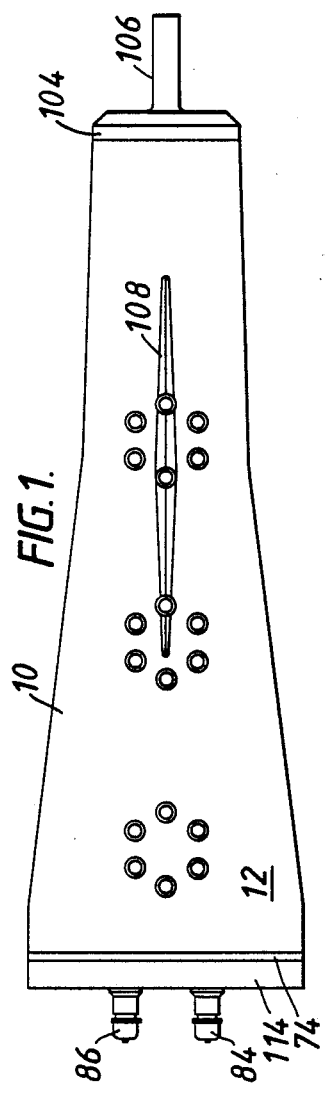
FIGS. 1 and 2 are respectively a plan and a longitudinal vertical section through the burster.
Figure 2:
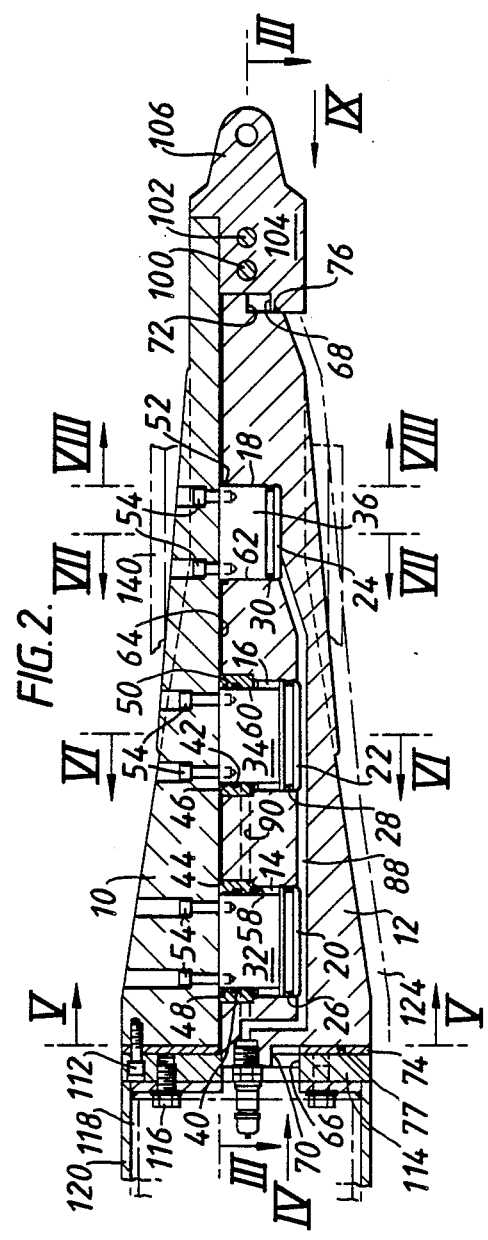
Figure 8:
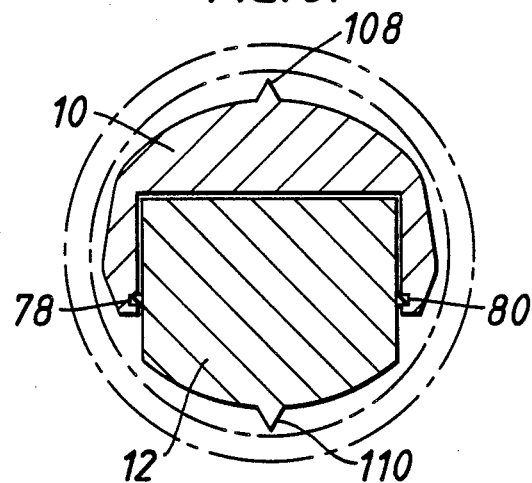
Figure 9:
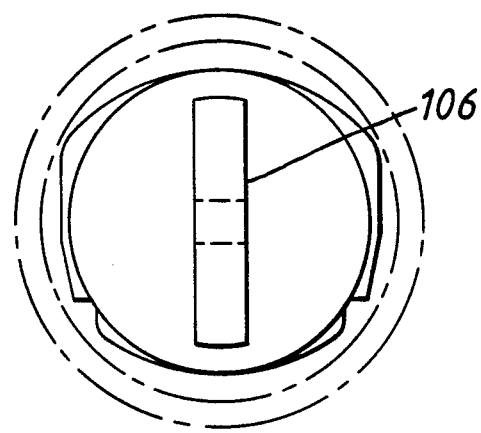
FIG. 9 is an end elevation seen in the direction of the arrow IX in FIG. 2.
Figure 10:
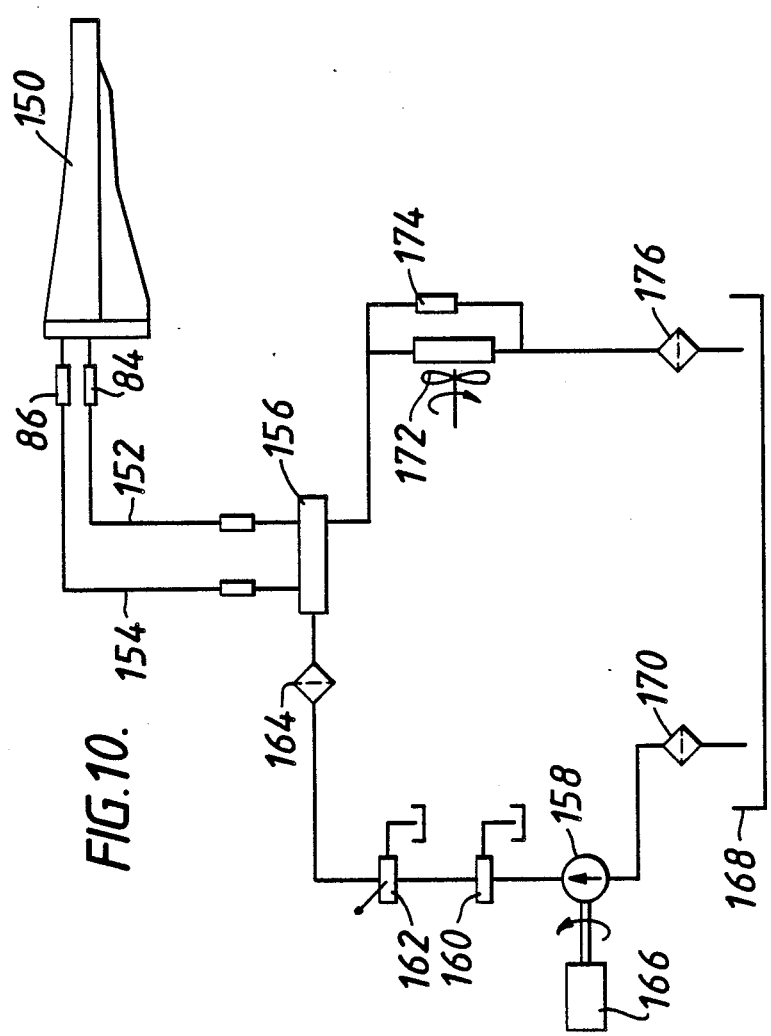
Figure 11:
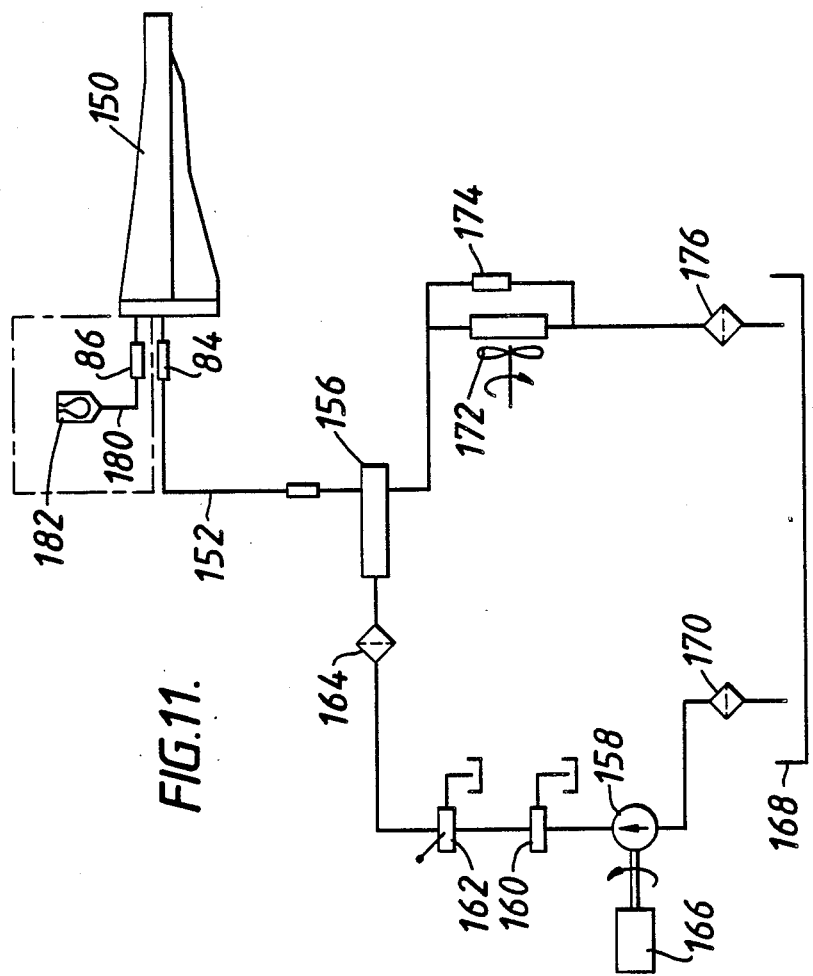
Figure 12:
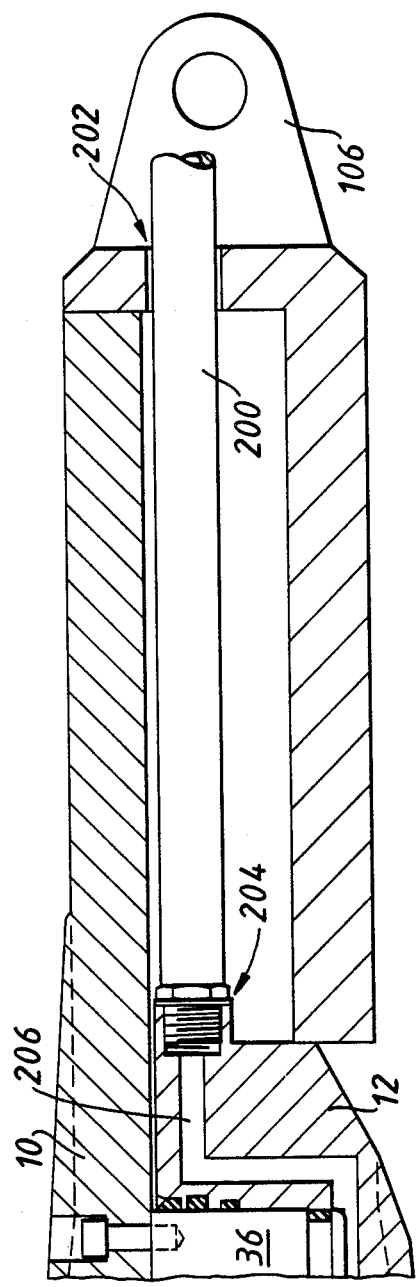

FIGS. 10 and 11 ae diagrams showing a typical hydraulic circuit and a modified circuit, respectively, for use with the burster described with reference to the preceding figures; and FIG. 12 is a scrap section through the leading end of the burster shown in FIGS. 1 & 2 showing a feed hose-line at the leading end as a modification.

The burster shown in FIGS. 1 to 9 comprises two main parts 10, 12 which extend lengthwise of the burster. The part 10 is uppermost in the burster in its position shown in the drawings so that the plan, FIG. 1, shows primarily the part 10. FIG. 3 shows primarily the part 12 in plan view and also shows the part 10 mainly in horizontal section.

The two parts 10, 12 are capable of relative separating and approach movements rectilinearly transversely to the length of the burster. Separating movement is effected by three piston-and-cylinder means 14, 16, 18 (FIG. 2). The three means 14, 16, 18 are spaced apart along the length of the burster. Only the means 14, 16 are double-acting so that they work in unison to effect relative approach movement of the parts 10, 12, the means 18 retracts idly during such movement.

The parts 10, 12 are, in this example of construction, steel castings and the part 12 has machined in it the three cylinders of the means 14, 16, 18. The cylinders of the means 14, 16, 18 have respective pistons 20, 22, 24 having respective O-ring seals 26, 28, 30 means 14 and 16 the pistons 22, 22 are integral with respective piston rods 32, 34 of reduced diameter so as to provide the double-acting capability. The piston 24 in the means 18 is integral with a piston rod 36 of effectively the same diameter as the piston. The diameters of the pistons 20, 22 are the same (90 millimetres for example) whereas the diameter of the piston 24 is slightly less (84 mm for example) because of the tapering shape of the body (see FIG. 7 for section through the means 18).

The piston rods 32 and 34 are engaged by respective O-ring seals 40, 42 mounted in steel rings 44, 46 respectively located in countersunk portions of the cylinders of the means 14 and 16. The piston rods 32 and 34 run through annular rubber shrouds 48, 50 located in the rings 44, 46 and the piston rod 36 runs through a shroud 52 located in a countersunk portion of the cylinder of the means 18.

The body 12 is effectively a cylinder block for the three means 14, 16, 18.

The three piston rods 32, 34, 36 are rigidly secured to the part 10 by screws 54.

The parts 10, 12 are mutually guided for relative rectilinear movement by the concave guide surfaces 58, 60 within the rings 44, 46 and the concave guide surface 62 within the continuation of the cylinder of the means 18, which surfaces slide against the convex outer surfaces of the corresponding piston rods 32, 34 and 36, respectively.

The relative approach movement of the parts 10, 12 is limited by engagement of the inner surface 64 of the member 10 with the outer end surfaces of the rings 44, 46 as shown in FIG. 2. The separating movement is limited by engagement of stop faces 66, 68 on the part 10 with respective stop faces 70, 72 on the part 12.

The rear end of the part 12 moves relatively to a hardened steel plate 74 on the part 10 to lessen deleterious effects of fine soil particles entering between the parts. A scraper seal 77 is provided in a groove in the plate 74, and the rear end of the part 12 slides against the seal 77. The two parts 10, 12 are otherwise mutually sealed by a seal 76 on the part 10 engaging the leading end of the part 12 (FIG. 2) and by lateral seals 78, 80 on the part 10 engaging the sides of the part 12 (see FIGS. 5 to 8).

The part 12 has at its rear end two couplings 84, 86 for hoses (not shown) which supply pressurised fluid to and conduct fluid from the piston-and-cylinder means 14, 16 and 18. The connector 84 communicates via a passage 88 with the cylinders of the means 14, 16, 18 at the undersides of the pistons 20, 22 and 24, so that pressurized fluid can be supplied to force the pistons outwardly to effect relative separating movement of the parts 10, 12. When the parts execute relative approach movement, fluid is expelled from the cylinders at the undersides of the pistons and passes through the passage 88 to tank.

The coupling 86 communicates via a passage 90 with the cylinders of the means 14, 16 at the top sides of the pistons 20 and 22 so that pressurised fluid can be supplied to force the pistons 20 and 22 inwardly to effect relative approach movement of the parts 10, 12. When the parts effect relative separating movement fluid is expelled from the cylinders at the top sides of the pistons 20, 22 and passes to tank (see FIGS. 10 and 11).

The part 10 is generally in the form of a channel (see FIGS. 5, 6, 7 and 8) and the part 12 is partly received within the part 10. The body made up of the two parts 10, 12 tapers towards the leading end. The leading end of the part 10 is connected by shear pins 100, 102 to a nose piece 104 providing a leading lug 106 to which a hawser (not shown) can be connected. Each part has an integral blade-like rib 108, 110 (FIG. 2).

The plate 74 is secured to the part 10 by screws 112 which also secure an end member 114 of similar inverted U-shape. Further screws 116 secure an annular member 118 to the burster. A liner 120 of thin-walled polyethylene, for example, can be clamped around or retained within the member 118 and pulled into the burst main or other pipe to afford protection against abrasion of the new replacement main of medium-density polyethylene subsequently inserted into the liner 120.

FIGS. 2 and 4 show the parts 10, 12 in their relatively fully approached position i.e. the minimum cross-section condition of the burster. However, FIG. 4 indicates by broken line at 124 the maximum cross-section of the burster at its rear end when the parts 10, 12 are relatively at their fully separated condition. As shown in FIG. 4, the transverse cross-sectional shape of the two parts 10, 12 making up the body of the burster is preferably such that there are substantially corner-shaped shoulders at four locations 132, 134, 136, 138. These locations correspond approximately to the positions of corners of a notional rectangle. Such shoulders are present at least where the burster is outside the unburst gas main or other pipe indicated approximately at 140 in FIG. 2. Typically, in this example, the main is nominally a pipe having an internal diameter of 152 mm (6 inch main).

The burster can be inserted when the parts 10, 12 are in their fully approached condition as shown in FIG. 2 until the end of the main (assumed to be "square" i.e. in an exactly normal transverse plane) is appoximately aligned with the centre of the piston 24.

FIG. 10 shows the burster 150 with its couplings 84, 86 connected by two high pressure lines 152, 154 to a direction control valve 156 for example of the type available from the Wandfluh company. The valve 156 receives pressurised hydraulic fluid from a pump 158 via a pilot relief valve 160 a dump valve 162 and a filter 164. The pump 158 is driven by a motor 166 and draws fluid from a reservoir tank 168 via a strainer 170. Excess fluid is returned to the tank 168 from the directional control valve 156 via a cooler 172, which has an in-line relief valve 174 in parallel with it, and a low-pressure filter 176.

FIG. 11 shows a modified hydraulic circuit in which the same reference numerals are used where appropriate. In this modification, only one external high pressure line 152 is used, connected to the coupling 84 of the burster 150. The coupling 86 is connected via a line 180 to a hydraulic accumulator 182, which acts like a return spring. The accumulator is shown for clarity on an enlarged scale compared with the burster 150 but in reality the accumulator is mounted on the rear end of the burster 150 without greatly increasing its length. Typically the accumulator 182 has a fluid capacity of about 1 litre. When the pistons 20, 22 are advanced they expel fluid via the passage 90 and the coupling 86 into the accumulator 182. The fluid entering the accumulator 182 compresses gas in the accumulator. When the directional valve 156 changes over, the stored gas pressure in the accumulator expels fluid at relatively low pressure back into the cylinders of the means 14, 16 to retract the pistons 20, 22 which retracts the part 10 together with the piston 24. The use of only one pressure line 152 greatly improves the handling of the burster 150 and its installation in a pipe to be burst because the line 152 is a flexible hose which has to be man-handled into position and progressively fed into the pipe as the burster 150 advances. The entrance to the pipe is in an excavation in the ground and the hydraulic power pack comprising the components shown in FIG. 11 is positioned on the surface of the ground. The pressure line 152 extends between the power pack and the burster 150 and may be some 50 metres or more in length depending on the legnth of the pipe to be burst. The normal working pressure of the fluid is set for example at $0.867 \times 10^7$ newtons/square meter (3000 pounds/square inch) by the relief valve 160. The pressure of the fluid delivered from the accumulator 182 is close to the working pressure. If preferred, hydraulic fluid is fed to the burster via a hose-line or lines through the leading end of the burster. The use of a single hose-line which is made possible preferably by an arrangement as shown in FIG. 11 is particularly suitable where it is preferred to supply the fluid through the leading end of the burster. FIG. 12 shows the leading end of a burster with a single hose-line 200, which has the same function as the line 152 in FIG. 11, extending through a hole 202 at the leading end wall 204 of the burster. The hose-line 200 is connected to a coupling 204 through which fluid passes to a passage 206, corresponding to the passage 88 shown in FIG. 2. The hose-line 200 is spooled on a drum (not shown) which hauls the attached to the lug 106. The hose-line 200 is relatively heavy and operation using only a single hose-line greatly reduces the handling difficulties by comparison with the use of two hose-lines. The use of a single hose-line is at the leading end particularly advantageous for example, where sewers are being re-lined with short pipe lengths. Where the feed of fluid is to the leading end of the burster the hose-line or lines must be fed through the unburst pipe to the burster before bursting begins.

In modifications (not shown) the accumulator is connected to all of the cylinders; or to at least one of them. The number of cylinders can be other than three. The diameters of the cylinders can be identical. The burster shown in FIGS. 1 to 9 is typically suitable for bursting 6-inch (152 mm) gas distribution mains made of cast iron. When inserted fully into such a pipe, with the two parts 10, 12 in their positions as shown in FIG. 2 fully approached towards one another, the external surfaces of the burster engage the inner surface of the mouth of the pipe in the transverse plane at the section line VII—VII shown in FIG. 2. The transverse height of the burster at its rear end in that condition of the parts 10, 12 is some 213 mm. The stroke of the relative movement of the parts 10, 12 is typically 25 mm. Once the pipe has been burst, such a burster typically pulls behind it into the burst and expanded pipe a polyethylene liner of 200 mm outside diameter and wall thickness 3 mm. The replacement main is a medium-density polyethylene pipe of 180 mm outside diameter.

Such a burster can burst pipes in the nominal range of 4 to 6 inches (102–152 mm). It is possible to increase the effective overall diameter of the burster by securing external shells to it, one on each part 10, 12. In this way the burster can be made to be effective in bursting pipeds up to 8 inches (204 mm) nominal diameter.

In larger sizes the burster is effective to burst even bigger pipes such as for example sewer pipes of nominally 9 inches (22 mm) in diameter, the outside diameter of the replacement pipe being up to 315 mm in that case.

In a further modification (not shown) the relative approach movement of the parts 10, 12 is effected by spring means e.g. one or more coil springs arranged between the parts and stressed by relative separating movement of the parts 10, 12.

I claim:

1. A pipe burster comprising an elongated body in two parts extending in the lengthwise direction of the body, the two parts being mutually guided by guide surfaces so as to be capable of relative rectilinear separating and approach movements transversely to said direction, hydraulic piston-and-cylinder means spaced apart along the body being operable in unison to effect at least said separating movement.

2. A burster according to claim 1 said piston-and-cylinder means comprising cylinders which are in one of said parts and which contain respective pistons having respective piston rods secured to the other of said parts, said guide surfaces comprising concave cylindrical surfaces on said one part and respective convex cylindrical surfaces on said piston rods.

3. A burster according to claim 1 said piston-and-cylinder means including double-acting piston-and-cylinder means operable to effect said closing movement.

4. A burster according to claim 1 one of said parts being in the form of a channel within which the other of said parts is partly received.

5. A burster according to claim 1 said body having a transverse cross-sectional shape in which there are substantially corner-shaped shoulders at four locations corresponding approximately to the positions of corners of a notional rectangle.

6. A burster according to claim 1 comprising a hydraulic accumulator connected to at least one of said piston-and-cylinder means.

* * * * *